(12) United States Patent
Sharifi

(10) Patent No.: US 12,209,875 B2
(45) Date of Patent: Jan. 28, 2025

(54) PROVIDING NAVIGATIONAL INSTRUCTIONS BASED ON CONTEXTUAL DATA

(71) Applicant: Google LLC, Mountain View, CA (US)

(72) Inventor: Matthew Sharifi, Kilchberg (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/781,292

(22) PCT Filed: Mar. 9, 2022

(86) PCT No.: PCT/US2022/019489
§ 371 (c)(1),
(2) Date: May 31, 2022

(87) PCT Pub. No.: WO2023/172259
PCT Pub. Date: Sep. 14, 2023

(65) Prior Publication Data
US 2024/0183671 A1 Jun. 6, 2024

(51) Int. Cl.
G01C 21/34 (2006.01)
(52) U.S. Cl.
CPC .................. *G01C 21/3461* (2013.01)
(58) Field of Classification Search
CPC .................................................. G01C 21/3461
See application file for complete search history.

(56) References Cited

U.S. PATENT DOCUMENTS

| | | | |
|---|---|---|---|
| 9,891,064 B2* | 2/2018 | Shah | G01C 21/3484 |
| 2013/0268189 A1* | 10/2013 | Kritt | G01C 21/343 |
| | | | 701/410 |
| 2015/0338223 A1 | 11/2015 | Letz | |
| 2018/0094943 A1 | 4/2018 | Grochocki, Jr. et al. | |
| 2019/0272589 A1* | 9/2019 | Simpson | G06Q 30/08 |
| 2020/0026776 A1* | 1/2020 | Boss | G06T 3/4092 |
| 2020/0166353 A1* | 5/2020 | Beaurepaire | G01C 21/3664 |
| 2020/0208998 A1* | 7/2020 | Xiang | G01C 21/3492 |
| 2021/0123752 A1* | 4/2021 | Rolf | G01C 21/3453 |
| 2021/0295619 A1* | 9/2021 | Tsuchiya | B60L 53/62 |

(Continued)

OTHER PUBLICATIONS

International Search Report and Written Opinion for Application No. PCT/US2022/019489, mailed Oct. 31, 2022, 13 pages.

(Continued)

*Primary Examiner* — Andrea C Leggett
(74) *Attorney, Agent, or Firm* — DORITY & MANNING P.A.

(57) ABSTRACT

A computing system and method that can be used for a mapping system that can recommend paths for navigational routing to a primary user. In particular, a primary user may be interested in navigational routes that secondary users, who may be the same or different from the primary user, have taken in the past. Even more particularly, the mapping systems described herein can provide improved user navigational services by leveraging the insight that users who have previously been in a similar situation (e.g., on vacation, in icy conditions, etc.) may wish to take the same route as they did the last time. Alternatively, users may desire to take routes based on routes which were taken by other users who are connected (e.g., via social media, address books, etc.).

20 Claims, 4 Drawing Sheets

(56) References Cited

U.S. PATENT DOCUMENTS

2021/0341300 A1    11/2021  Beaurepaire et al.
2022/0027413 A1*   1/2022   Quint ................. G06F 16/9535

OTHER PUBLICATIONS

International Preliminary Report on Patentability for Application No. PCT/US2022/019489, mailed Sep. 19, 2024, 8 pages.

* cited by examiner

PROVIDING NAVIGATIONAL INSTRUCTIONS BASED ON CONTEXTUAL DATA

PRIORITY CLAIM

This application is based upon and claims the right of priority under 35 U.S.C. § 371 to International Application No. PCT/US2022/019489 filed on Mar. 9, 2022, which is incorporated by reference herein.

FIELD

The present disclosure relates generally to geographic information systems or other mapping applications. In particular, the present disclosure is directed to systems and methods for using historical user routes to recommend routes based on contextual data.

BACKGROUND

A client device such as a smartphone or a laptop computer can operate a browser, mapping application, or a geographic information system to provide maps and/or other geographic information and data to a user. For example, a user can search a map for one or more generalized destinations. As another example, a map can be provided in response to a web search query that implicitly calls for geographic results, such as when the search may be satisfied by a plurality of points of interest respectively having physical locations. Generally, the client device can communicate with a server over a network in order to obtain the appropriate geographic information to provide to the user.

Furthermore, once a destination has been determined, a navigation system can automatically calculate a route and provide instructions to the determined destination. In particular, the navigation system primarily optimizes for specific criteria such as distance traveled or time. However, there are instances where a user may desire to follow a navigational route which is not necessarily optimal based on distance traveled or time, for example due to various extraneous circumstances or preferences.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for providing navigation instructions to a user. The method comprises a computing system receiving data descriptive of a first location associated with a primary user and contextual data associated with the first location. The method comprises the computing system obtaining content associated with a plurality of historical user navigational routings wherein each of the plurality of historical user navigational routings has associated contextual data. The method comprises the computing system generating a plurality of comparison values associated with a respective comparison between the contextual data and the plurality of historical user navigational routings. The method comprises the computing system determining a proposed path for the navigational routing based at least in part on the plurality of comparison values. The method comprises the computing system providing the proposed path for the navigational routing for display to the primary user.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

A full and enabling description of the present disclosure, directed to one of ordinary skill in the art, is set forth in the specification, which makes reference to the appended figures, in which.

DETAILED DESCRIPTION

Overview

Figure 1:
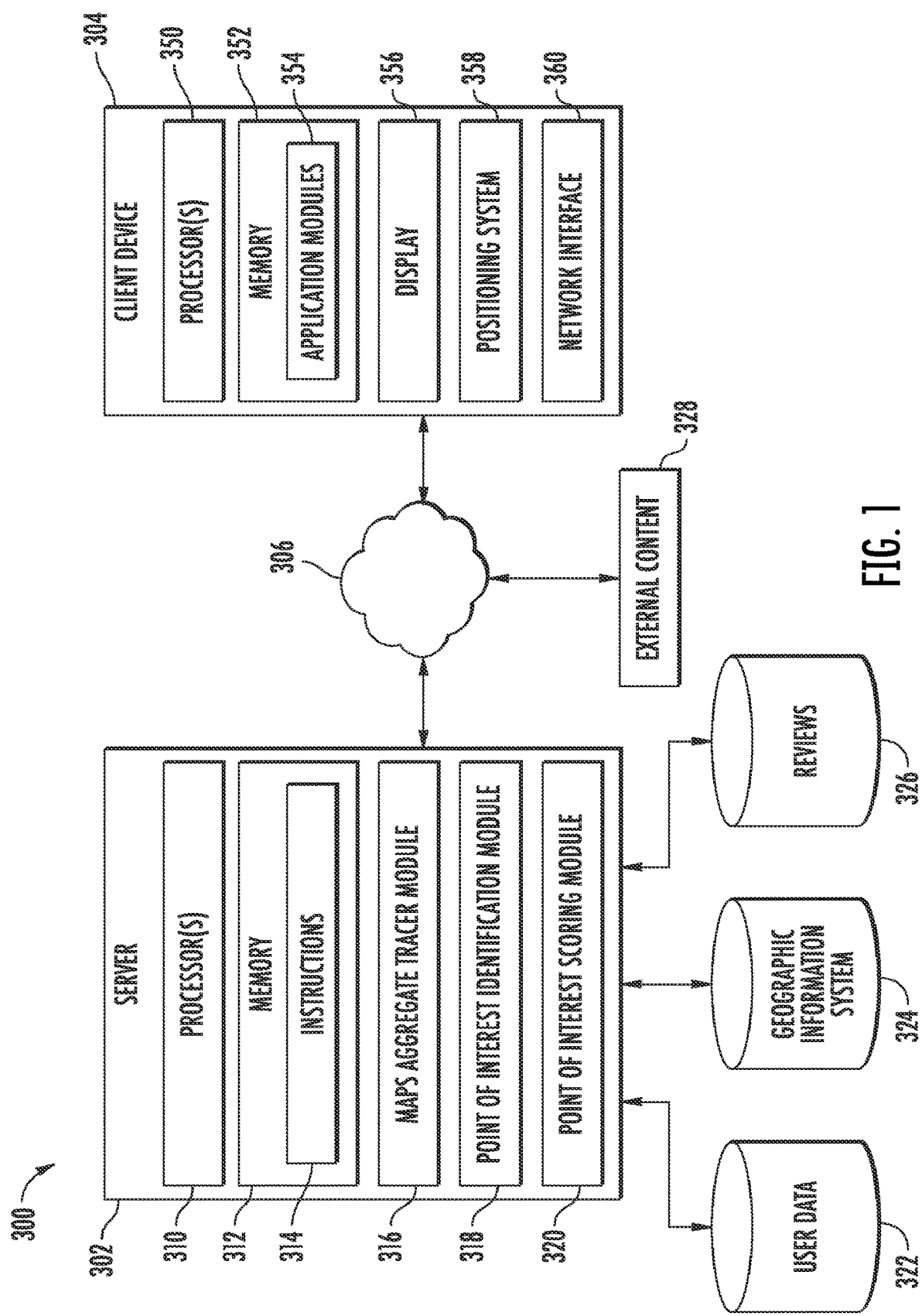
FIG. 1 depicts a block diagram of example computing systems according to example embodiments of the present disclosure.

Generally, the present disclosure is directed to a computerized mapping system that can recommend paths for navigational routing to a primary user. More particularly, a primary user may be interested in navigational routes that secondary users, who may be the same or different from the primary user, have taken in the past. Therefore, example mapping systems described herein can include a maps aggregate tracer that can aggregate data directed to historical navigational routings that users have taken. The mapping system can predict at least one desirable historical navigational routing out of the plurality of historical navigational routings. In particular, according to an aspect of the present disclosure, the mapping system can predict at least one desirable historical navigational routing based at least in part on contextual data. Specifically, as one example, routes that the primary or secondary users have previously taken can be associated with a set of context data descriptive of context (e.g., weather conditions, time of day, day of week, co-passengers, trip intent, etc.) that occurred when the route was previously taken. Then, at a subsequent instance, if the current context matches the context data from a previous route, the previous route can automatically be suggested to the primary user (e.g., even if the previous route is sub-optimal in terms of travel time or distance).

Thus, the mapping systems described herein can provide improved user navigational services by leveraging the insight that users who have previously been in a similar situation (e.g., on vacation, in icy conditions, etc.) may wish to take the same route as they did when previously faced with similar context. Alternatively, users may desire to take routes based on routes which were taken by other users who are connected (e.g., via social media, address books, etc.). Therefore, for example, reviews or other data obtained from secondary users who have visited points of interest can be used to influence a recommended route (e.g., selection of recommended stops, alternative route to avoid back roads which may be iced over, etc.) for the primary user.

More particularly, aspects of the present disclosure enable the user to make particular routes "sticky" based on contextual data such that the next time a similar contextual situation arises (e.g., icy road conditions) a mapping computing system can automatically navigate (e.g., provide a navigational route to or for) the user based on the sticky alternative route. Thus, the mapping system can generate a tailored navigational routing that guides the primary user optimally based on one or more historical navigational routings by connected secondary users.

According to an aspect of the present disclosure, in some implementations, a computing system comprising one or more computing devices can receive data descriptive of a first location associated with a primary user. For example, the first location associated with the primary user can be a first location input by the primary user (e.g., into a user interface) indicating the primary user's desire to pursue routes from the first location. As another example, the first location associated with the primary user can be a location associated with the current location of the primary user (e.g., based on contextual data). In particular, the computing system can receive contextual data associated with the first location associated with the primary user. Furthermore, contextual data can include a wide variety of information outside of location-based data. As a particular example, contextual data can include weather conditions of the primary user location of the primary user. For instance, the weather conditions may be determined to be icy at the user's location. As another particular example, contextual data can include the purpose of the primary user embarking on the trip (e.g., a business trip, vacation, etc.). Further examples of contextual data can include a start or destination location, a second user traveling with the primary user, a transportation method (e.g., bus, train, car, walk, etc.) a time or date, a traffic incident (e.g., road closure, traffic congestion, etc.), a stop the user made, an activity performed by the user, etc.

In some implementations, the computing system can receive one or more images or other sensor data associated with the historical user navigational routing. In particular, the one or more images or other sensor data can be used to extract further contextual data. As a particular example, the computing system can extract data associated with an activity performed by the user based on the images or other sensor data associated with a particular historical navigational routing. Even more particularly, the proposed path can be further based at least in part on the additional contextual data.

Even more particularly, the computing system can obtain content associated with a plurality of historical user navigational routings. For instance, the plurality of historical user navigational routings can be previously traversed. In particular, the plurality of historical user navigational routings can be previously traversed by one or more secondary users. Even more particularly, the one or more secondary users can be the same or differ from the primary user. Specifically, the plurality of historical user navigational routings can each have associated contextual data. Continuing the first example, the plurality of historical user navigational routings can each have weather conditions associated with them. Continuing the second example, the plurality of historical user navigational routings can each have trip intents associated with them.

In some implementations, a plurality of comparison values associated with a respective comparison between the contextual data and the plurality of historical navigational routings can be generated. Continuing the examples from above, the primary user may be in Washington DC. The computing system can receive content associated with historical secondary user navigational routings wherein the received content is associated with historical trips secondary users have taken to Washington DC. Even more particularly, the secondary users may be the primary user or the primary user's friends. The computing system can receive data associated with the comparison values associated with respective comparisons between the contextual data and the plurality of historical navigational routings. For instance, if the user is in Washington DC for vacation while it is snowing, historical navigational routings with a high comparison score may be suggested. For instance, historical navigational routings that secondary users took when they were in Washington DC on vacation while in the snow can have high comparison scores (e.g., despite the route not being optimized for time or distance traveled from the start to destination location) as opposed to routes taken by secondary users when they were in Washington DC on a business trip in the summer. Furthermore, content associated with points of interest that the secondary users stopped at while on their snowy vacation to Washington DC and reviews the secondary users gave to those points of interest can be obtained.

In some implementations, a proposed path for the navigational routing can be determined. In particular, the proposed path for the navigational routing can be determined based at least in part on the plurality of comparison values. Continuing the example from above, the computing system can determine a proposed path for the navigational routing based on the one or more trips that secondary users had taken to Washington DC for vacation while it was snowing.

In some implementations, the proposed path for the navigational routings can be provided. In particular, the proposed path for the navigational routings can be provided for display to the primary user. Continuing the example from above, the computing system can surface a proposed path for navigating Washington DC to the primary user on a user interface such as a web mapping platform.

In some implementations, a default proposed path can be adapted. In particular, the computing system can adapt the default proposed path based on the contextual data associated with the user location. In particular, data indicative of a user input requesting the adaptation of the default proposed path based on the contextual data associated with the user location can be received. For example, a user may have a route which the user takes to work which includes using back roads. However, when weather conditions are icy, the user may take a different route to avoid taking back roads that are more likely to be iced over. Thus, the computing system can adapt the default proposed path for the navigational routing to work to avoid back roads when the computing system determines that the weather conditions are icy based on the contextual data associated with the user location. In some instances, the computing system can prompt the user as to whether they would like to adapt their default proposed path to an icy conditions route and adapt the default path upon receiving user input associated with an affirmative request.

In some implementations, the proposed path can be provided to the primary user. In particular, providing the proposed path can include providing navigational instructions associated with the adapted proposed path for the navigational routing. For example, the computing system can surface a proposed path for navigating to work when there are icy weather conditions which is adapted to avoid back roads to the primary user on a user interface such as a web mapping platform.

In some implementations, the computing system can determine a plurality of stops. In particular, the plurality of stops can be associated with the historical user navigational routing. Furthermore, the computing system can provide navigational instructions associated with the plurality of stops associated with the historical user navigational routing. Even more particularly, the computing system can indicate to the primary user that particular stops were made in the historical navigational routing. Specifically, the computing system can surface or audibly communicate to the primary user that there is an upcoming stop from the historical navigational routing. Continuing the example from above, the computing system can include the Lincoln Monument in the proposed path for the navigational routing based at least in part on the primary user having taken a route including the Lincoln Monument a few years prior while on vacation to Washington DC in the snow. The computing system can surface or audibly broadcast to the primary user "You visited the Lincoln Monument 2 years ago when you were navigating the same route." In some cases, the computing system can include the Lincoln Monument in the proposed path for the navigational routing based at least in part on secondary users stopping at the Lincoln Monument and giving the Lincoln Monument high reviews (e.g., over 3 stars out of 5).

In some implementations, data descriptive of a second primary user input can be received. In particular, the data descriptive of the second primary user input can be directed to selecting at least one destination. For example, the second primary user input can be directed to the primary user indicating a desire to go to a particular location. As a particular example, the second primary user input can be directed to the primary user indicating a desire to go to the Washington Monument. In particular, the data descriptive of the second primary user input selecting at least one destination can include data indicative of the second primary user input selecting one or more destinations out of one or more selectable destinations. Even more particularly, the one or more selectable destinations can be surfaced based at least in part on the one or more stops associated with the plurality of historical navigational routings. For example, the computing system can surface the most popular destinations based at least in part on the primary user's current location. As a particular example, a primary user located in Washington, DC can have selectable destinations such as the Washington Monument or the White House surfaced. In particular, the computing system can surface the Washington Monument, or the White House based on a value (e.g., a percentage, a majority, a number of, etc.) of historical navigational routings that have taken secondary users by the Washington Monument or the White House.

In some implementations, one or more additional stops can be determined. In particular, the one or more additional stops can be determined based at least in part on the plurality of historical navigational routings. To continue the example from above, the computing system can identify that a value of historical navigational routings (e.g., a percentage, a majority, a number of, etc.) that have gone past the Washington Monument have also gone past the Lincoln Monument.

In some implementations, the one or more additional stops can be based at least in part on a ranking value associated with the plurality of historical navigational routings. For instance, the secondary users may have reviewed stops that they took on their historical navigational routings. In particular, the secondary users may have assigned numerical values (e.g., 1-10) to stops that they took on their historical navigational routings. Even more particularly, the computing system can identify one or more additional stops if the additional stop has a particular review value (e.g., higher than a particular threshold, higher than another potential additional stop). To continue the example from above, the computing system can identify that a value of historical navigational routings (e.g., a percentage, a majority, a number of, etc.) that have gone past the Washington Monument have also gone past the Lincoln Monument as well as the Korean War Memorial. The computing system may compare reviews (e.g., numerical values) given to the Lincoln Monument and the Korean War Memorial.

In some implementations, the computing system can receive data indicating a primary user preference of number of additional stops to include in the proposed path. In some implementations, the computing system can receive data indicating a primary user preference for secondary user review value threshold.

In some implementations, the proposed path can be generated based at least in part on a combination of the data descriptive of a user location, the data descriptive of a second primary user input selecting at least one destination, and one or more additional stops. To continue the example from above, the computing system can generate a proposed path to the Washington Monument that includes a stop at the Lincoln Monument. The path to the Washington Monument including a stop at the Lincoln Monument can be optimized based on the user's current location. For example, the proposed path can direct the user by the Lincoln Monument first on the way to the Washington Monument if the route would be better optimized in that order (e.g., if the travel time would be shorter, if the travel distance would be shorter, etc.).

In some implementations, the plurality of historical user navigational routings can be associated with a plurality of connected users. For example, the plurality of connected users can include a plurality of connections via a social network. As another example, the plurality of connected users can include a plurality of connections via an address book contained in a primary user device associated with the primary user.

In some implementations, the computing system can receive data descriptive of a selection by the primary user of at least one connected user. In particular, the at least one connected user can be selected out of the plurality of connected users. In some cases, the computing system can receive data descriptive of a selection by the primary user of at least one connected user based on previous selections the primary user has made (e.g., contacts favorite list, social media favorites, etc.) Even more particularly, the computing system can obtain only content associated with the historical user navigational routings associated with the selected at least one connected user.

In some implementations, the computing system can determine a subset of the plurality of connected users. In particular, the computing system can determine a subset of the plurality of connected users based at least in part on contextual data. For example, the computing system can determine a subset of the plurality of connected users based at least in part on connected users the primary user was communicating with (e.g., within a threshold amount of time). In particular, the primary user may have been communicating with a secondary user via social media, text, email, phone, or any other communication method. Even more particularly, the computing system can determine a subset of the plurality of connected users based at least in part on communication content. Continuing the example from above, the computing system can determine at least one connected user that the primary user communicated with about Washington DC.

In some implementations, the ranking value can include a value associated the one or more stops being ranked hierarchically. In particular, the one or more stops can be ranked hierarchically based at least in part on reviews associated with the plurality of connected users. In particular, the computing system can weigh particular connected user reviews more heavily when determining the ranking value of potential stops. For example, the computing system can weigh the at least one selected connected user more heavily when determining the ranking value of potential stops. As another example, the computing system can weigh the at least one connected user that the primary user was discussing an upcoming trip with. As yet another example, the one or more stops can be ranked hierarchically based at least in part on ranking criteria outside of reviews (e.g., time of day, weather, etc.) wherein the computing system can additionally weight the ranking criteria outside of reviews.

In some implementations, the ranking value can include a value associated with the one or more stops being ranked hierarchically based at least in part on aggregate user data. In particular, the ranking value can include a value based at least in part on secondary user reviews regardless of connection to primary user. Even more particularly, the ranking value can include a value based at least in part on a number of historical user visits. For example, a potential stop can receive a higher ranking value the more historical user visits are recorded.

In some implementations, providing, by the computing system, the proposed path for the navigational routing for display to the primary user can include providing the proposed path for the navigational routing for display to the primary user in an augmented reality interface. In particular, the computing system can present granular instructions for the primary user to engage with particular sights that a secondary user saw by surfacing an augmented reality interface after a user arrives at a secondary user stop. For example, the computing system may determine that the primary user has arrived by vehicle to a secondary user stop and is now walking. Now that the user is walking the computing system may determine that the user would desire more granular instructions such that the user can walk along the same path (e.g., the path can include pauses and angular directions) a secondary user did in order to see particular sights exactly as the secondary user had.

In some implementations, the plurality of aggregated navigational routings associated with the plurality of secondary user trips which occur within a distance from the primary user (e.g., within a particular threshold distance) can be surfaced for a user. In particular, the plurality of navigational routings can be labeled such that the primary user can identify which navigational routing is associated with which secondary user trip. For example, a particular navigational routing can be labeled "Dad—Spring 2002" to indicate that the primary user's father had taken this navigational routing in spring of 2002. In particular, the primary user can select one specific secondary user trip out of the surfaced plurality of historical user navigational routings which are associated with a plurality of secondary user trips.

In some implementations, the plurality of aggregated secondary user trips which occur within a distance from the primary user can be combined into a particular number of potential navigational routings. In particular, the plurality of secondary user trips can be optimized to generate one or more potential navigational routings for the primary user. In particular, the one or more optimized potential navigational routings can be labeled such that the primary user can identify which secondary user trips were leveraged to generate the associated potential navigational routings. For example, a particular navigational routing can be labeled "optimized route of Dad—Spring 2002 and Sarah—Summer 2010" to indicate that the potential navigational routing has been optimized from two secondary user trips.

In some implementations, a single historical user navigational routing can be optimized. For example, a historical user navigational routing may take a road that is currently closed. In response, the computing system can reroute the historical user navigational routing so as to avoid the closed road. As another example, the historical user navigational routing may have involved the secondary user doubling back (e.g., due to missing a turn, etc.). The computing system can optimize the historical user navigational routing by eliminating such redundancies in the proposed path.

In some implementations, the computing system can optimize a proposed navigational routing based on contextual information such as the purpose of the trip. For example, the computing system can determine that a trip taken with the purpose of getting to work may be optimized by travel time. Alternatively, a trip taken with the purpose of vacation may be optimized by maximizing the potential sites for the primary user to stop at.

In some implementations, at the end of a navigation session, the computing system may surface a prompt to the primary user asking if they would like to store their route for reuse. In particular, the computing system can surface indicators on the user interface such that the primary user can interact with the user interface to indicate whether they would like to store their route or not.

In some implementations, the computing system can launch the mapping application due to user interaction with a computing assistant outside of the mapping application. For instance, the primary user can interact with a computing assistant to indicate that they desire a navigational route to a certain destination. Upon receiving this data, the computing assistant can launch the mapping application which can generate a proposed navigational route based on the primary user's data associated with the interaction with the computing assistant.

In some implementations, the primary user can indicate in their initial query requesting a navigational route a particular historical route that they would like to refer back to. For example, the primary user can input that they would like to navigate a route they took on highway 1 last summer. In response, the computing system can leverage the contextual data associated with the request (e.g., highway 1 route, last summer, secondary user is the same as the primary user, etc.) to generate a proposed navigational route based on the historical data. In particular, natural language processing models can be used to extract a set of constraints from a primary user's query. For instance, the natural language processing model can be machine-learning based (e.g., deep neural networks), heuristic-based, grammars based, or some combination of approaches. Some extracted constraints may have associated parameters. For example, "last summer" can be associated with a particular time frame (e.g., May-August of the previous year) although the primary user did not specifically give a date in the initial query.

In some implementations, if there are multiple historical routes which satisfy the extracted criteria from the primary user's query, the multiple historical routes can be ranked to determine which predetermined number to surface to the primary user. In particular, the multiple historical routes can be ranked based on any number of parameters such as recency, frequency, or some other relevance score (e.g., what percentage of the user's criteria was matched).

In some implementations, no historical match may match the primary user's query. In response, the computing system can surface to the primary user that there were no known trips with the attributes requested by the primary user in the query.

Thus, the present disclosure provides a mapping system that can recommend paths for navigational routing to a primary user. More particularly, example aspects of the present disclosure involve computing systems and computer-implemented methods for facilitating a primary user interested in navigational routes that secondary users, either the same or different from the primary user, have taken in the past in which a navigational route can be suggested based on contextual data and data aggregated from historical navigational routes taken by secondary users.

The systems and methods of the present disclosure provide a number of technical effects and benefits. As one example of a technical effect, the proposed techniques are able to provide a more optimized method to generate a navigational route. In particular, by indicating that particular routes are preferred in particular contextual situations (e.g., icy weather conditions), the computing system can cache specific routes so as to optimize the computing system by surfacing tailored routes based on contextual data to a user without the need to recompute one or more optimized navigational routes every time.

Furthermore, the proposed systems enhance user efficiency by automatically generating an optimized navigational route based on contextual data and one or more historical navigational routes. By automatically generating an optimized navigational route, the proposed techniques allow users to reduce the rate and/or volume of data transmissions by reducing the amount of navigational routes generated. For example, in order to accommodate multiple desirable stops, a user may need to compare several navigational routes before determining the most optimized navigational route. However, by being presented the most optimized navigational route initially, the user no longer needs to compute multiple routes for comparison purposes. In particular, by reducing the number of navigational routes generated to achieve the same output of an optimized navigational route, the proposed systems can save additional computational resources (e.g., processor usage, memory usage, network bandwidth, etc.).

With reference now to the Figures, example embodiments of the present disclosure will be discussed in further detail.

Example Devices and Systems

FIG. 1 depicts an example system 300 according to an example embodiment of the present disclosure. System 300 can include a client-server architecture, where a server 302 communicates with one or more client devices 304 over a network 306. Although one client device 304 is illustrated in FIG. 1, any number of client devices can be connected to server 302 over network 306.

Client device 304 can be, for example, a computing device having a processor 350 and a memory 352, such as a wireless mobile device, a personal digital assistant (PDA), smartphone, tablet, navigation system located in a vehicle, handheld GPS system, laptop computer, desktop computer, computing-enabled watch, computing-enabled eyeglasses, gaming console, embedded computing system, or other such devices/systems. In short, client device 304 can be any computer, device, or system that can interact with the server system 302 (sending and receiving data) to implement the present disclosure.

Processor 350 of client device 304 can be any suitable processing device and can be one processor or a plurality of processors that are operably connected. Memory 352 can include any number of computer-readable instructions or other stored data. In particular, memory 352 can include, store, or provide one or more application modules 354. When implemented by processor 350, application modules 354 can respectively cause or instruct processor 350 to perform operations consistent with the present disclosure, such as, for example, running a mapping application or a browser application in order to obtain and display personalized maps. Other modules can include a virtual wallet application module, a web-based email module, a game application module, or other suitable application modules.

It will be appreciated that the term "module" refers to computer logic utilized to provide desired functionality. Thus, a module can be implemented in hardware, firmware and/or software controlling a general purpose processor. In one embodiment, the modules are program code files stored on the storage device, loaded into memory and executed by a processor or can be provided from computer program products, for example, computer executable instructions that are stored in a tangible computer-readable storage medium such as RAM hard disk or optical or magnetic media.

Client device 304 can include a display 356. Display 356 can be any suitable component(s) for providing a visualization of information, including, for example, touch-sensitive displays (e.g. resistive or capacitive touchscreens), monitors, LCD screens, LED screens (e.g. AMOLED), or other display technologies.

Client device 304 can further include a positioning system 358. Positioning system 358 can determine a current geographic location of client device 304 and communicate such geographic location to server 302 over network 306. The positioning system 358 can be any device or circuitry for analyzing the position of the client device 304. For example, the positioning system 358 can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

In the instance in which the user consents to the use of positional or location data, the positioning system 358 can analyze the position of the client device 304 as the user moves around in the world and provides the current location of client device 304 to the server 302 over network 306. The current location of client device 304 can be displayed on the map and can influence aspects of the present disclosure, including scores assigned to point of interest search results.

Client device 304 can further include a network interface 360. Network interface 360 can include any suitable components for interfacing with one more networks, including for example, transmitters, receivers, ports, controllers, antennas, or other suitable components.

Server 302 can be implemented using one or more suitable computing devices and can include a processor 310 and a memory 312. For example, server 302 can be one server computing device or can be a plurality of server computing devices that are operatively connected. In the instance that server 302 includes a plurality of server computing devices, such plurality of server computing devices can be organized into any suitable computing architecture, including parallel computing architectures, sequential computing architectures, or some combination thereof.

Processor 310 can be any suitable processing device and can be one processor or a plurality of processors which are operably connected. Memory 312 can store instructions 314 that cause processor 310 to perform operations to implement the present disclosure, including performing aspects of method (500) of FIG. 5.

Server 302 can include one or more modules for providing desired functionality. For example, server 302 can include a maps aggregate tracer module 316, a point of interest identification module 318, and a point of interest scoring module 320. Other modules to perform additional functionality can be included as well.

Server 302 can implement maps aggregate tracer module 316 to identify prior itineraries that historical users connected to the current user traveled. For example, maps aggregate tracer module 316 can use user data 322 such as a user location history, user email data, or other user data to identify historical user itineraries aligning with predicted user trips.

Server 302 can implement point of interest identification module 318 to identify a plurality of points of interest that are responsive to a search query. For example, point of interest identification module 318 can be implemented to interact with a geographic information system 324 to identify a plurality of points of interest.

Server 302 can implement a point of interest scoring module to determine or calculate a score for each of a plurality of points of interest. For example, point of interest scoring module 320 can compute the score for each point of interest according to a scoring formula or scoring metric. In some embodiments, the scoring formula can be a weighted average that provides different weightings to a plurality of variables. The variables can be information relevant to the value of each point of interest as a search result (e.g. how well does the point of interest satisfy the search query, how close is the point of interest to the user's current location or the specified location, etc.).

Server 302 can be coupled to or in communication with one or more databases, including a database providing user data 322, a geographic information system 324, a database containing reviews 326, and external content 328. Although databases 322, 324, 326, and 328 are depicted in FIG. 1 as external to server 302, one or more of such databases can be included in memory 312 of server 302. Further, databases 322, 324, 326, and 328 can each correspond to a plurality of databases rather than a single data source.

User data 322 can include, but is not limited to, email data including textual content, images, email-associated calendar information, or contact information: social media data including comments, reviews, check-ins, likes, invitations, contacts, or reservations; calendar application data including dates, times, events, description, or other content: virtual wallet data including purchases, electronic tickets, coupons, or deals: scheduling data; location data: SMS data: or other suitable data associated with a user account. Generally, according to an aspect of the present disclosure, such data can be analyzed to determine when a user is traveling and a place of accommodation at which such user may be staying.

Importantly, the above provided examples of user data 322 are simply provided for the purposes of illustrating potential data that could be analyzed, in some embodiments, to identify when a user is traveling and a place of accommodation at which such user may be staying. However, such user data is not collected, used, or analyzed unless the user has consented after being informed of what data is collected and how such data is used. Further, in some embodiments, the user can be provided with a tool to revoke or modify the scope of permissions. In addition, certain information or data can be treated in one or more ways before it is stored or used, so that personally identifiable information is removed or stored in an encrypted fashion.

According to another aspect of the present disclosure, user data 322 can further store or provide a plurality of location histories respectively associated with a plurality of users. In particular, when a user elects to participate and has signed into her user account with respect to one or more of her computing devices, then such user computing device can periodically send a location update to server 302. Alternatively, the user location histories can be built and maintained by a computing system that is separate and unique from server 302 and the user location histories can simply be accessed by server 302.

For example, each location update can identify the presently active user account and a unique device identifier that corresponds to the device providing the update. Each location update can further include a location (e.g. latitude and longitude) and a timestamp identifying the date and time of day. In some implementations, location updates can further include an accuracy indicator and/or other identifying information such as an originating IP address or a WiFi or cell tower identifier.

Additional information can be used to build or supplement a user location history as well. As an example, whenever a user is logged into a user account and performs a web search or uses one or more applications, such as a mapping application, it is possible that such interaction can result in obtaining the user's location. Therefore, an entry can be formed in the associated user location history based on such interaction. As another example, if a user provides consent, transaction data from a digital wallet can be used to identify locations visited by the user.

All received location updates can be stored and associated with a particular user so that a user location history is built over time. Furthermore, in the event that the location reports provided by the user computing device simply provide a geo-location (e.g. a latitude and longitude), one or more algorithms can be applied to such location data to identify a particular point of interest that the user likely visited. Thus, the user location history for each user can provide a history of visits by such user to points of interest over time.

Geographic information system 324 can store or provide geospatial data to be used by server 302. Example geospatial data includes geographic imagery (e.g., digital maps, satellite images, aerial photographs, street-level photographs, synthetic models, etc.), tables, vector data (e.g. vector representations of roads, parcels, buildings, etc.), point of interest data, or other suitable geospatial data. Geographic information system 324 can be used by server 302 to provide navigational directions, perform point of interest searches, provide point of interest location or categorization data, determine distances, routes, or travel times between locations, or any other suitable use or task required or beneficial for performing the present disclosure.

Review database 326 can store a plurality of reviews respectively associated with a plurality of points of interest. Furthermore, information or statistics concerning the reviews can be included in the review database 326 as well. For example, the user who contributed each review and the date of contribution can be accessible by a review determination system.

Computer-based system 300 can further include external content 328. External content 328 can be any form of external content including news articles, webpages, video files, audio files, written descriptions, ratings, game content, social media content, photographs, commercial offers, transportation method, weather conditions, or other suitable external content. Server system 302 and client device 304 can access external content 328 over network 306. External content 328 can be searched by server 302 according to known searching methods and can be ranked according to relevance, popularity, or other suitable attributes, including location-specific filtering or promotion.

Network 306 can be any type of communications network, such as a local area network (e.g., intranet), wide area network (e.g., Internet), or some combination thereof and can include any number of wired or wireless links. In general, communication between the server 302 and a client device 304 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL). Preferably, however, client device 304 can freely move throughout the world and communicate with server 302 is a wireless fashion.

Figure 2:
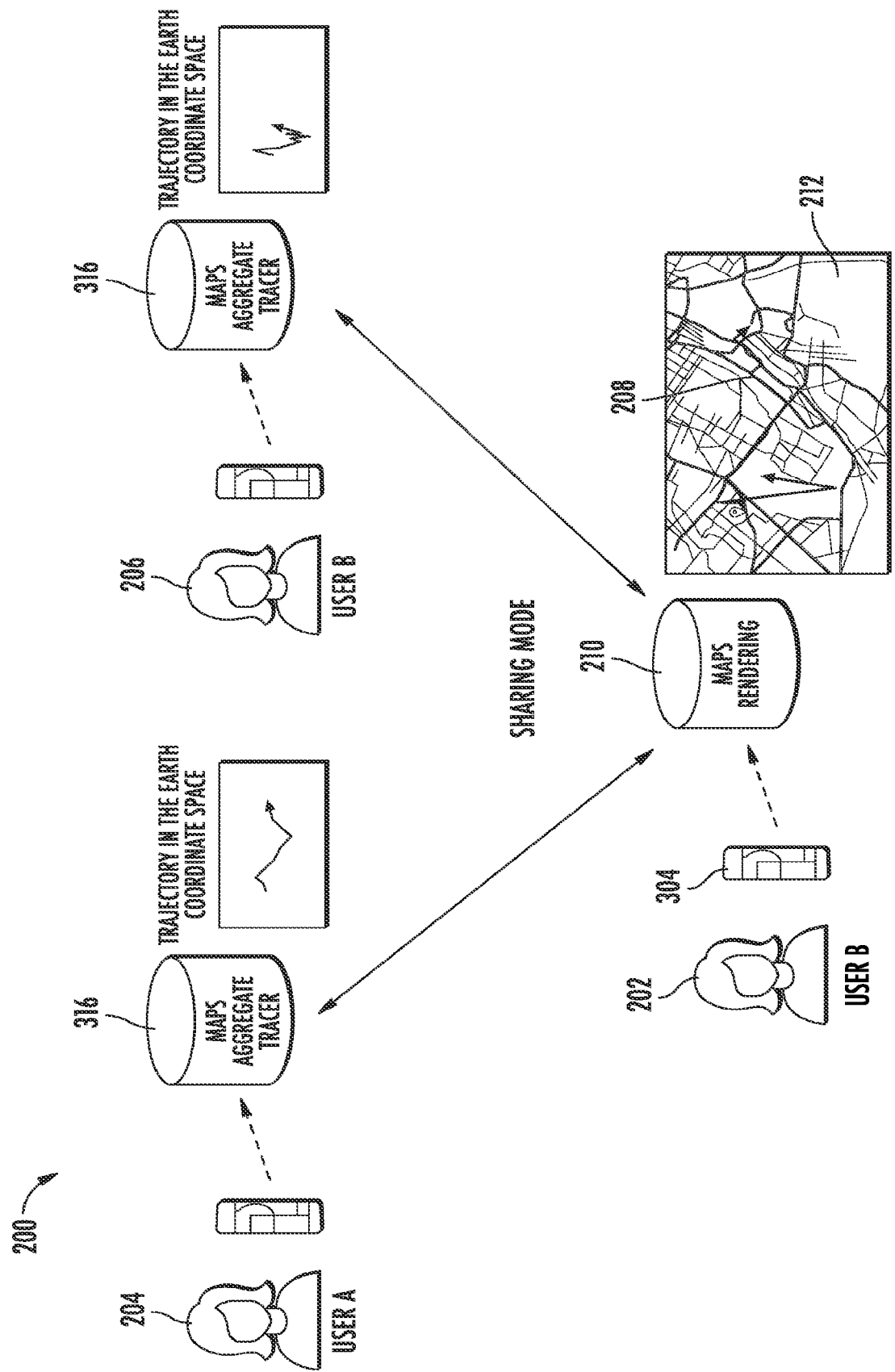
FIG. 2 depicts a block diagram of an example computing system according to example embodiments of the present disclosure.

FIG. 2 depicts an example system 200 according to an example embodiment of the present disclosure. System 200 can include a client-server architecture, where a server communicates with one or more client devices 304. Although one client device 304 is illustrated in FIG. 2, any number of client devices can be connected to the server.

In some implementations, a primary user 202 may be connected to secondary users (e.g., a first secondary user 204 and a second secondary user 206). In particular, the primary user 202 can be connected to the secondary user(s) 204 based at least in part on social media (e.g., friends, followers, etc.). Even more particularly, the primary user 202 can be connected to the secondary user(s) 204 based at least in part on contacts (e.g., phone address book). Alternatively, the secondary user 206 can be the same individual as the primary user 202.

In some implementations, one or more secondary users 204 and 206 can take a trip which can be saved in the server. In particular, with reference to FIG. 1, data associated with trips taken by the secondary users can be saved in the maps aggregate tracer module 316. In particular, data associated with trips can include both navigational data as well as contextual data associated with the trips. Although only data associated with two secondary user trips are shown as being saved in the maps aggregate tracer module 316, a plurality of secondary user trips can be saved in the maps aggregate tracer module 316. In particular, the data associated with trips taken by the secondary users can be compressed (e.g., lossless, lossy, etc.) such that the compressed data associated with trips taken by the secondary users can be saved in the maps aggregate tracer module 316.

In some implementations, the primary user client device 304 and the server can communicate such that the primary user client device 304 can generate a one or more potential navigational routings 208 based at least in part on the plurality of aggregated secondary user trips saved in the maps aggregate tracer module 316. In particular, the primary user client device 304 can generate the one or more potential navigational routings 208 based at least in part on a user location (e.g., based on the primary user client device 304 positioning system 358) in combination with contextual data associated with the primary user's current trip as well as the contextual data associated with the secondary users' historical trips. Even more particularly, the primary user client device 304 can generate one or more potential navigational routings 208 using a maps renderer module 210 wherein the maps renderer module 210 can be contained in the primary user client device 304. Even more particularly, the one or more potential navigational routings 208 can be generated in a navigational routing interface 212. Specifically, the maps renderer module 210 can generate the one or more potential navigational routings 208 as an overlay. Even more specifically the maps renderer module 210 can generate the one or more potential navigational routings 208 as an overlay on top of a map interface.

Example User Experience

Figure 3:
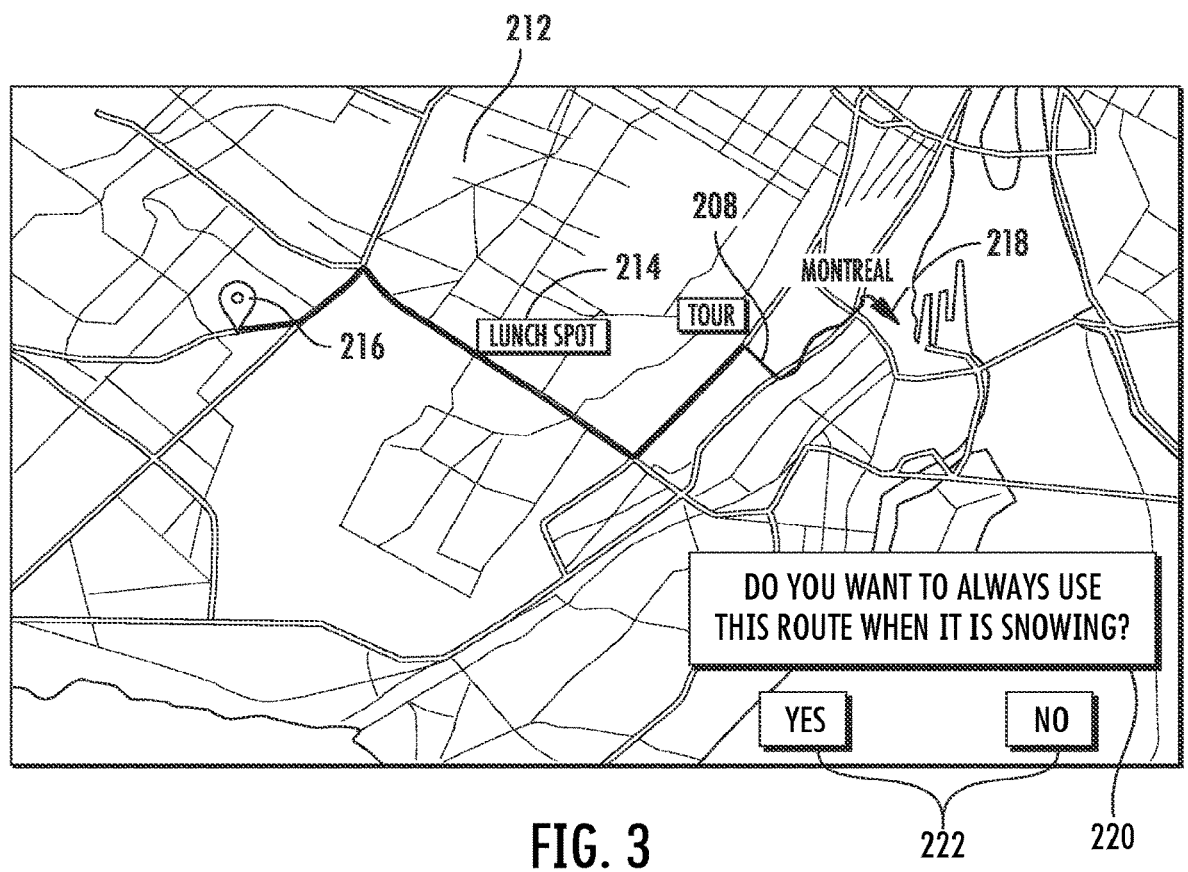
FIG. 3 depicts an example user interface of obtaining route results according to an example embodiment of the present disclosure.

FIG. 3 depicts an example user interface of obtaining one or more potential navigational routings according to an example embodiment of the present disclosure. In particular, navigational routing interface 212 of a mapping application shows a potential navigational routing 208 displayed for a user.

In some implementations, the computing system can generate a potential navigational routing 208 most optimized on travel time based on the plurality of aggregated secondary user trips. In particular, the computing system can generate a potential navigational routing 208 based on the shortest travel time possible using particular transportation services (e.g., metro/train, car, bicycle, walk, any combination, etc.). For example, the computing system can determine what routes used in secondary user trips that were the quickest and recommend a navigational routing leveraging the quickest routes taken in secondary user trips.

In some implementations, the computing system can generate a potential navigational routing 208 most optimized to take the primary user by secondary users' most highly reviewed or most visited stops 214. In particular, the potential navigational routing 208 can suggest to the primary user stops that were highly reviewed by secondary users (e.g., food, museums, views, activities, stores, etc.). For instance, the potential navigational routing can take the user by a restaurant that was highly reviewed or most visited by secondary users. In particular, the computing system can determine based on the time that a user would be most likely to be interested in a particular genre of food (e.g., breakfast, brunch, lunch, dinner, snack, desert, etc.). Even more particularly, the computing system can generate the potential navigational routing based at least in part on a restaurant that was highly reviewed by secondary users for the particular genre of food predicted to be most interesting to a user.

In some implementations, the computing system can generate a potential navigational routing 208 that is not optimized on travel time but allows a primary user to optimize the number of highly reviewed or most visited stops included on the potential navigational routing 208. In particular, the computing system can leverage contextual data such as date and time to determine whether stops are open or not such that the generated potential navigational routing 208 can only include stops which the primary user could visit.

In some implementations, the computing system can generate a potential navigational routing 208 based on a particular start location 216 and/or end location 218. In some cases, the start location 216 and/or the end location 218 can be user input. In some cases, the start location 216 and/or the end location 218 can be automatically generated. For example, the start location 216 can be automatically generated based on contextual data such as primary user location. As another example, the end location 218 can be automatically generated based on a recommended stop generated by the potential navigational routing 208.

In some implementations, the computing system can generate a potential navigational routing 208 based on contextual data. As one example, the computing system can generate a potential navigational routing 208 based on the weather conditions of the location of the primary user. For instance, the generated navigational routing 208 can avoid roads that are more likely to be iced over. Alternatively, the generated navigational routing 208 can be aligned with a historical navigational routing that a secondary user had taken during similar weather conditions (e.g., to avoid roads that are more likely to be iced over). In particular, the computing system can surface a query 220 asking the primary user if they would like to make the generated potential navigational routing 208 the new default route whenever contextual conditions match the current situation in the future (e.g., when weather conditions are icy again in the future). The primary user can respond to the query 220 by interacting with user interface elements 222 to indicate whether they would like to initiate a new contextual based default navigational routing.

Example Methods

Figure 4:
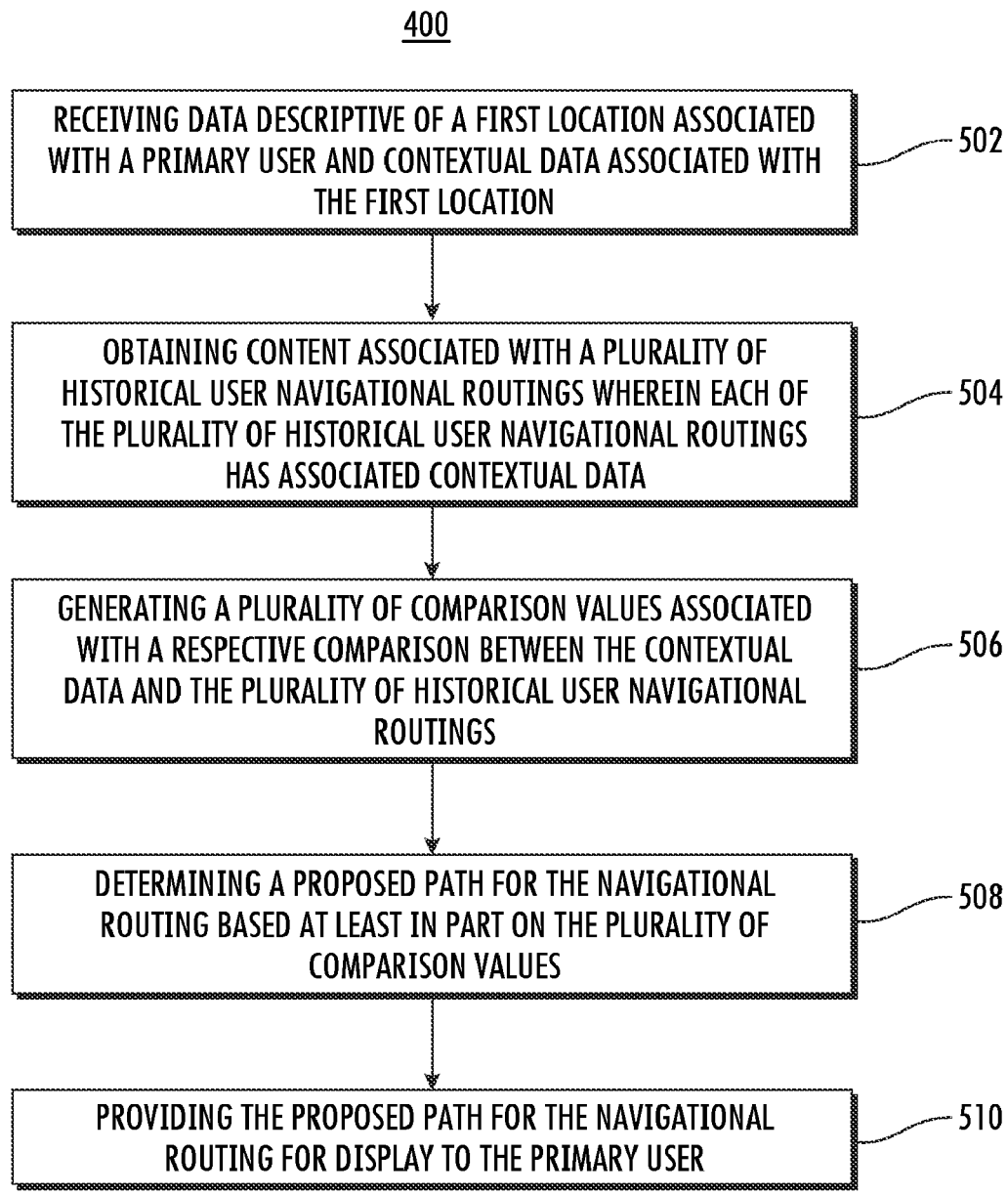
FIG. 4 depicts a flow chart of an example method for using aggregated historical users' data to provide suggested routes according to an example embodiment of the present disclosure.

FIG. 4 depicts a flow chart diagram of an example method to perform according to example embodiments of the present disclosure. Although FIG. 4 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, a computing system comprising one or more computing devices can receive data descriptive of a first location. Specifically, the first location can be associated with the primary user. In particular, the computing system can additionally receive contextual data. Even more particularly, the contextual data can be associated with the first location. Furthermore, contextual data can include a wide variety of information outside of location-based data. As a particular example, contextual data can include weather conditions of the primary user location of the primary user. For instance, the weather conditions may be determined to be icy at the user's location. As another particular example, contextual data can include the purpose of the primary user embarking on the trip (e.g., a business trip, vacation, etc.). Further examples of contextual data can include a start or destination location, a second user traveling with the primary user, a transportation method (e.g., bus, train, car, walk, etc.) a time or date, a traffic incident (e.g., road closure, traffic congestion, etc.), a stop the user made, an activity performed by the user, etc.

At 504, the computing system can obtain content associated with a plurality of historical user navigational routings. In particular, each of the plurality of historical user navigational routings can have associated contextual data. For instance, the plurality of historical user navigational routings can be previously traversed. In particular, the plurality of historical user navigational routings can be previously traversed by one or more secondary users. Even more particularly, the one or more secondary users can be the same or differ from the primary user. Specifically, the plurality of historical user navigational routings can each have associated contextual data. Continuing the example from above, the plurality of historical user navigational routings can each have weather conditions associated with them. Continuing another example from above, the plurality of historical user navigational routings can each have trip intents associated with them.

At 506, the computing system can generate a plurality of comparison values. In particular, the plurality of comparison values can be associated with a respective comparison between the contextual data and the plurality of historical user navigational routings. Continuing the examples from above, the primary user may be in Washington DC. The computing system can receive content associated with historical secondary user navigational routings wherein the received content is associated with historical trips secondary users have taken to Washington DC. Even more particularly, the secondary users may be the primary user or the primary user's friends. The computing system can receive data associated with the comparison values associated with respective comparisons between the contextual data and the plurality of historical navigational routings. For instance, if the user is in Washington DC for vacation while it is snowing, historical navigational routings with a high comparison score may be suggested. For instance, historical navigational routings that secondary users took when they were in Washington DC on vacation while in the snow can have high comparison scores (e.g., despite the route not being optimized for time or distance traveled from the start to destination location) as opposed to routes taken by secondary users when they were in Washington DC on a business trip in the summer. Furthermore, content associated with points of interest that the secondary users stopped at while on their snowy vacation to Washington DC and reviews the secondary users gave to those points of interest can be obtained.

At 508, the computing system can determine a proposed path for the navigational routing. In particular, the proposed path for the navigational routing can be determined based at least in part on the plurality of comparison values. Continuing the example from above, the computing system can determine a proposed path for the navigational routing based on the one or more trips that secondary users had taken to Washington DC for vacation while it is snowing.

At 510, the computing system can provide the proposed path for the navigational routing for display to the primary user. Continuing the example from above, the computing system can surface a proposed path for navigating Washington DC to the primary user on a user interface such as a web mapping platform. As another example, the computing system can provide the proposed path for the navigational routing for display to the primary user in augmented reality.

What is claimed is:

1. A computer-implemented method for providing navigation instructions to a user, the method comprising:
   receiving, by a computing system comprising one or more computing devices, data descriptive of a first location associated with a primary user and contextual data associated with the first location;

obtaining, by the computing system, content associated with a plurality of historical user navigational routings, wherein each of the plurality of historical user navigational routings has associated contextual data, and wherein the plurality of historical user navigational routings comprise historical secondary user navigational routings associated with the contextual data of secondary users that matches the contextual data associated with the first location;

determining, by the computing system, a plurality of stops associated with the plurality of historical user navigational routings, wherein the plurality of stops are ranked based on a number of historical visits to each of the plurality of stops;

generating, by the computing system, a plurality of comparison values associated with a respective comparison between the contextual data and the plurality of historical user navigational routings associated with the plurality of stops that are ranked based on the number of historical visits to each of the plurality of stops;

determining, by the computing system, a proposed path for the navigational routing based at least in part on the plurality of comparison values; and providing, by the computing system, the proposed path for the navigational routing for display to the primary user.

2. The computer-implemented method of claim 1, further comprising:
adapting, by the computing system, a default proposed path for the navigational routing based on the contextual data associated with the first location;
wherein providing the proposed path comprises providing navigational instructions associated with the adapted proposed path for the navigational routing.

3. The computer-implemented method of claim 2, further comprising:
receiving, by the computing system, data indicative of a user input requesting the adaptation of the default proposed path based on the contextual data associated with the first location.

4. The computer-implemented method of claim 1, wherein the associated contextual data comprises one or more of:
a start location or destination location;
a second user traveling with the primary user;
a transportation method;
a weather condition;
a time or date;
a trip purpose;
a traffic incident;
a stop the user made; or
an activity performed by the user.

5. The computer-implemented method of claim 1, further comprising:
receiving, by the computing system, one or more images associated with the plurality of historical user navigational routings;
extracting, by the computing system, additional contextual data from the one or more images associated with the plurality of historical user navigational routings; and
determining, by the computing system, the proposed path further based at least in part on the additional contextual data.

6. The computer-implemented method of claim 1, wherein determining a proposed path for the navigational routing is based at least in part on optimizing the plurality of historical user navigational routings.

7. The computer-implemented method of claim 1, further comprising:
providing, by the computing system, more than one proposed path for the navigational routing; and
receiving, by the computing system, data descriptive of a user input selecting one proposed path from the more than one proposed path.

8. The computer-implemented method of claim 1, wherein providing the proposed path comprises providing navigational instructions associated with the plurality of stops that are ranked based on a number of historical visits to each of the plurality of stops.

9. The computer-implemented method of claim 1, wherein the plurality of historical user navigational routings are labeled to identify the secondary users associated with the plurality of historical user navigational routings that were travelled by the secondary users.

10. A computing system, comprising:
one or more processors; and
one or more non-transitory, computer-readable media that store instructions that when executed by the one or more processors cause the computing system to perform operations, the operations comprising:
receiving data descriptive of a first location of a primary user;
receiving contextual data associated with the first location;
receiving data descriptive of a user input requesting generation of navigation instructions;
receiving content associated with a plurality of historical user navigational routings, wherein each of the plurality of historical user navigational routings has associated contextual data, and wherein the plurality of historical user navigational routings comprise historical secondary user navigational routings associated with the contextual data of secondary users that matches the contextual data associated with the first location;
determining a plurality of stops associated with the plurality of historical user navigational routings, wherein the plurality of stops are ranked based on a number of historical visits to each of the plurality of stops;
generating a plurality of comparison values associated with each comparison between the contextual data and the plurality of historical user navigational routings associated with the plurality of stops that are ranked based on the number of historical visits to each of the plurality of stops;
determining a proposed path for navigational routing based at least in part on the plurality of comparison values; and
providing the proposed path for the navigational routing for display to the primary user.

11. The computing system of claim 10, further comprising:
adapting, by the computing system, a default proposed path for the navigational routing based on contextual data associated with a user location.

12. The computing system of claim 11, further comprising:
receiving, by the computing system, data indicative of a user input requesting the adaptation of the default proposed path based on the contextual data associated with the user location.

13. The computing system of claim 10, wherein providing the proposed path comprises providing navigational instructions associated with the plurality of stops that are ranked based on a number of historical visits to each of the plurality of stops.

14. The computing system of claim 10, further comprising:
    receiving, by the computing system, one or more images associated with the plurality of historical user navigational routings;
    extracting additional contextual data from the one or more images associated with the plurality of historical user navigational routings; and
    determining the proposed path based at least in part on the additional contextual data.

15. The computing system of claim 10, wherein determining a proposed path for the navigational routing is based at least in part on optimizing the plurality of historical user navigational routings.

16. The computing system of claim 10, further comprising:
    providing, by the computing system, more than one proposed path for the navigational routing; and
    receiving, by the computing system, data descriptive of a user input selecting one proposed path from the more than one proposed path.

17. The computing system of claim 10, wherein the plurality of stops are ranked based on reviews associated with a plurality of connected users.

18. The computing system of claim 10, wherein the plurality of historical user navigational routings are labeled to identify the secondary users associated with the plurality of historical user navigational routings that were travelled by the secondary users.

19. One or more non-transitory computer-readable media that store instructions that, when executed by one or more processors of a computing system, cause the computing system to perform operations comprising:
    receiving data descriptive of a first location of a primary user;
    receiving contextual data associated with the first location;
    receiving data descriptive of a user input requesting generation of navigation instructions;
    receiving content associated with a plurality of historical user navigational routings, wherein each of the plurality of historical user navigational routings has associated contextual data, and wherein the plurality of historical user navigational routings comprise historical secondary user navigational routings associated with the contextual data of secondary users that matches the contextual data associated with the first location;
    determining a plurality of stops associated with the plurality of historical user navigational routings, wherein the plurality of stops are ranked based on a number of historical visits to each of the plurality of stops;
    generating, by the computing system, a plurality of comparison values associated with each comparison between the contextual data associated with the user location and the plurality of historical user navigational routings associated with the plurality of stops that are ranked based on the number of historical visits to each of the plurality of stops;
    determining a proposed path for navigational routing based at least in part on the plurality of comparison values; and
    providing the proposed path for the navigational routing for display to the primary user.

20. The one or more non-transitory computer-readable media of claim 19, wherein providing the proposed path comprises providing navigational instructions associated with the plurality of stops that are ranked based on a number of historical visits to each of the plurality of stops.

* * * * *